United States Patent [19]
Babayev et al.

[11] Patent Number: 5,615,121
[45] Date of Patent: Mar. 25, 1997

[54] SYSTEM AND METHOD FOR SCHEDULING SERVICE PROVIDERS TO PERFORM CUSTOMER SERVICE REQUESTS

[75] Inventors: Djangir A. Babayev; Richard M. Berger, both of Boulder; Vincil C. Dean, Edgewater; Ronald L. Hansen, Louisville; Scott H. Parrish, Boulder, all of Colo.

[73] Assignee: U S West Technologies, Inc., Boulder, Colo.

[21] Appl. No.: 381,657

[22] Filed: Jan. 31, 1995

[51] Int. Cl.$^6$ ............................. G06F 19/00; G06F 17/60
[52] U.S. Cl. ...................................... 395/209; 364/468.06
[58] Field of Search ................................. 364/401–403, 364/468, 406; 395/912, 925, 926

[56] References Cited

U.S. PATENT DOCUMENTS

| | | | |
|---|---|---|---|
| 5,006,983 | 4/1991 | Wayne et al. | 364/401 |
| 5,459,656 | 10/1995 | Fields et al. | 364/401 |
| 5,467,268 | 11/1995 | Sisley et al. | 364/401 |

*Primary Examiner*—Roy N. Envall, Jr.
*Assistant Examiner*—Thomas E. Brown
*Attorney, Agent, or Firm*—Sheridan, Ross & McIntosh

[57] ABSTRACT

A scheduling system is disclosed for scheduling tasks for fulfilling a series of service requests. When each service request is received, a determination is made as to the amount of resources a task requires to provide the requested service. Further, a preferred time within which to perform the task is obtained from the requestor of the service request. For each service request, data for the estimated amount of resources and the preferred time are supplied, on a first-come-first-serve basis, to a scheduling component for solving a combinatorial optimization model which efficiently allocates a predetermined amount of resources for each time slot in a scheduling period by rearranging tasks for service requests previously received. The scheduling component provides for a service requestor, without regard to subsequently received service requests, a service time in which to perform the task for the requested service substantially immediately after the service request is made. Whenever possible, the service time coincides with the preferred time. Each previously received service request will have its related task performed within the service time provided to the requestor of the service request. The scheduling system is particularly useful in scheduling technician time for service calls received by customer representatives in the telecommunication and utility industries.

48 Claims, 7 Drawing Sheets

SYSTEM AND METHOD FOR SCHEDULING SERVICE PROVIDERS TO PERFORM CUSTOMER SERVICE REQUESTS

FIELD OF THE INVENTION

The present invention relates to scheduling service providers to perform customer service requests and in particular to responding immediately to each customer service request with a time interval in which to perform the service while also being able to optimize the utilization of the service providers.

BACKGROUND OF THE INVENTION

In many service related industries a customer service request necessitates the scheduling of an appointment for a service provider to perform the requested service. Providing service schedules for large numbers of service requests and relatively large numbers of service providers is typically difficult to accomplish in a cost effective manner. That is, it is difficult to arrange service appointments providing high utilization of service provider personnel without incurring inordinate scheduling time delays and/or costs.

In some service industries there are additional difficulties in scheduling in that coordination must be made with each customer to, for example, arrange access to the customer's premises. Such coordination is particularly prevalent in utility and telecommunication industries. It is typical when such coordination is required, that each customer requesting service is given a service time interval within which the customer's requested service is to be performed. Thus, a customer is required to be accessible during the service time interval for a service provider to perform the requested service.

It is common practice in industries providing such service time intervals in response to customer service requests that service time intervals are typically larger than the estimated time to perform the requested service. This strategy provides additional flexibility in scheduling service providers in that there is allowance or flexibility for schedule changes without the need for additional contacts with customers and rearrangement of service appointments. However, to provide customer satisfaction, it is also preferred that the service time intervals agree or overlap as much as possible with preferred service request times given by customers. Thus, accomplishing the two goals of effectively scheduling service providers and also accommodating the preferred service times given by customers becomes even more difficult.

Previous attempts to satisfy both the goal of efficient scheduling for service providers and the goal of accommodating customer preferred service times have focused on obtaining all or substantially all customer service requests before formulating a schedule for service providers. Thus, customers with service requests are typically contacted at some later time after the initial customer request and provided with a time which may or may not correspond with any customer preferred time interval for the service request. This strategy, however, has the disadvantages of: (a) increasing scheduling overhead in that customers must be re-contacted which may involve multiple contact attempts for a single service request; (b) necessitating further inconvenience for customers requesting service; and (c) typically requiring an early cut off date wherein no further customer requests are taken for certain dates not yet having service provider schedules.

Thus, it would be advantageous to have a scheduling capability wherein there is a service time interval provided to each customer during the initial contact when the customer requests service, wherein each service time interval substantially overlaps a customer preferred service time, and wherein the provided service time intervals obtained can be used to efficiently schedule service providers.

SUMMARY OF THE INVENTION

In a general context, the present invention is a scheduling tool for scheduling resources to perform requested tasks wherein the entire set of tasks to be scheduled is not known prior to commencement of a "scheduling" of a particular task. In particular, tasks are allocated resources in the order that they are received. In one preferred embodiment of the present invention, hereinafter denoted as a "scheduler," tasks to satisfy customer service requests are scheduled according to a predetermined forecast of available resources. During a customer's initial service request contact, a customer preferred service time interval in which the service request task is to be performed is determined (i.e., as specified by the customer). The scheduler uses this preferred interval to immediately: either inform the customer that the required service task will be performed in the customer's preferred time interval or, if it's impossible, provide the customer with a specified service time when the task will be performed. When a specific time is provided, resources are "assigned" to perform the service requested task; that is, the resources are allocated to the task and they are excluded from any further resource rearranging activities. Thus, the resources allocated for this particular task cannot be reallocated to a different task at some later time. Alternatively, if a service time interval is provided, then there is typically more time within the service time interval than necessary to perform the task. That is, the service time interval has "time flexibility." Such time flexibility allows the task to be shifted within its service time interval as other tasks for subsequent service requests are subsequently scheduled, although the initial task remains scheduled for performance within the service time interval given to the customer. Thus, instead of assigning resources for a particular task as when a specific time is provided, in the present invention resources are merely allocated such that they may be reallocated to another task if the initial task is shifted to a different time and allocated other resources within its specified service time interval.

Thus, in this preferred embodiment, it is an aspect of the present invention to provide for the efficient allocation of resources wherein the resources are service provider time such that for each customer service request generating a service time interval, the actual scheduling of a service provider may be performed at a later date than when the initial customer service request is received within, however, the constraints of the previously specified service time interval.

It is also an aspect of the scheduler of the present invention to provide the above capabilities by using a resource allocation model, hereinafter denoted the Daily Floater Model (DFM), belonging to the class of combinatorial optimization models which have been developed for scheduling problems. That is, the DFM includes: (a) an optimization function relating to the efficiency of utilization of service providers; and (b) a set of constraints, the constraints defining scheduling criteria such as, for example, the constraints that there is at most one service start time per service appointment or constraints insuring that for every work hour the number of service providers assigned for services does not exceed the total number of available service providers according to the predetermined forecast. The DFM attempts to satisfy the one or more sets of constraints while simultaneously determining an optimal or extreme value for the optimization function. In one preferred embodiment, the optimization function provides values related to the amount of unassigned and unallocated service provider time. Therefore, in this case, the DFM is used to minimize the value of the optimization function while satisfying the one or more sets of constraints provided.

It is a further aspect of the present invention to use DFM scheduling models for concurrently constructing schedules for each of a plurality of scheduling time periods (e.g., days or weeks) where the resources are known or forecasted for each such time period and further to schedule service requests which require a plurality of such time periods by decomposing these requests into a plurality of shorter service requests wherein each shorter service request may be performed within a single scheduling time period.

It is a further aspect of the present invention that no additional contact with a customer, prior to performing the service requested, is required. Thus, for tasks having time flexibility, the present invention requires the DFM models to honor each service time period supplied to a customer, thus insuring that customers do not have to be contacted to reschedule service times.

Other features and benefits of the present invention will become apparent from the accompanying figures and the detailed description following hereinafter.

DETAILED DESCRIPTION

The scheduler of the present invention is used to solve problems which differ significantly from traditional scheduling problems. In traditional prior art scheduling problems, the set of tasks (equivalently jobs, requests, etc.) to be scheduled is given or provided before any scheduling is performed. Consequently, a mathematical model describing the constraints of a traditional scheduling problem, such as available resources and feasible time windows to satisfy the requests, is solved only once and the resulting solution provides an optimal schedule for the tasks.

Regarding the scheduler of the present invention, however, requested tasks are provided to the present invention sequentially and the scheduler is required to respond in real time with a service interval within which each requested task can be performed. Thus, when a new task is requested, the present invention dynamically attempts to rearrange previously entered tasks to make efficient use of the resources available to perform all tasks and at the same time satisfy time constraints that may be associated with each task.

In one preferred embodiment and use of the present invention, the scheduler includes a software tool for scheduling appointments of technicians required to carry out, for instance, repair and installation tasks requested by the customers of a telephone company. In particular, customers typically phone in service requests to company representatives who may, in turn, activate the scheduler of the present invention via, for example, a data entry device, and provide the customer, substantially immediately, with information regarding the time frame within which the service request may be satisfied. To accomplish both the immediate feedback to a customer and at the same time efficiently allocate resources (i.e., technician time), the scheduler retains information regarding time flexibility in performing the service request tasks. More precisely, whenever the time interval within which a task is to be done is sufficiently greater than the estimated time to accomplish the task (i.e., time flexibility), then specifying the exact starting time for performing the service request task is delayed so that such delays may be used in allowing tasks for additional future service requests to be performed within the same scheduling period (e.g., a day or a week).

In this preferred embodiment, when the scheduler of the present invention is activated by a customer service representative, the customer service representative determines at least an estimation as to the time required to perform the requested task and preferred times within which the task may be performed. In particular, a preferred starting day, a preferred starting time within the day, a preferred last day by which completion of the task last is to be accomplished, and a preferred time for completion within the last day are solicited from the customer. Thus, based on this information and information regarding the resources (i.e., technician time) available, the scheduler generates a time interval for accomplishing the task which may be supplied immediately to the customer. In supplying this time interval to the customer, the scheduler generates, whenever possible, a time to perform the service request task in accordance with the customer supplied time preferences. However, if the customer preferred time interval cannot be accommodated due to previous customer service requests, then an alternative appointment time may be provided to the customer wherein the alternative time is relatively close to the customer preferred time interval. For example, consider as a simple case, the scheduling of a single technician's time for a scheduling period of two consecutive days. If a first service request is received from a first customer having a preferred starting time of 8 a.m. on the first day, a preferred completion time of 5 p.m. on the first day, an estimated task duration of three hours, and there are no tasks scheduled for these two days, then the task (hereinafter denoted the first task) for this first service request may be tentatively scheduled for 8 a.m. of the first day and the service time interval provided to the first customer is the preferred time interval. Subsequently, if a second service request is received having a preferred starting time of 9 a.m. on the first day, a preferred completion time of 11 a.m. on the first day, and an estimated task duration of one hour, then since the first task can be shifted and still remain within its service time interval previously provided to the first customer, the first task may be shifted to start, for example, at 11:30 a.m. on the first day, thereby allowing the preferred time interval for the second service request to be accepted as the service time interval due to the shifting of the first task. Thus, this second service time interval is provided to the customer who supplied the second service request. Subsequently, if a third service request is received having a preferred starting time of 1 p.m. on the first day, a preferred completion time of 5 p.m. on the first day and an estimated task duration of four hours, then this preferred time is not accepted as the service time interval since no shifting of the first two entered tasks within their service time intervals will allow the task for this third service request to be performed within its preferred time interval. Thus, the task for this third service request may be, with the requesting customer acceptance, provided with a service time interval of 1 p.m. on the second day to 5 p.m. on the second day.

Based upon the foregoing, it will be appreciated that the present invention effectively generates a new schedule on each new customer service request. That is, in those cases where a time interval is provided to previous customers for the relevant time period (e.g., a day) and a new service request is taken for the same time period, resources will actually be allocated within each of the various and previously specified time intervals when generating or attempting to generate a time interval to be provided to the new customer on the new service request.

Figure 1:
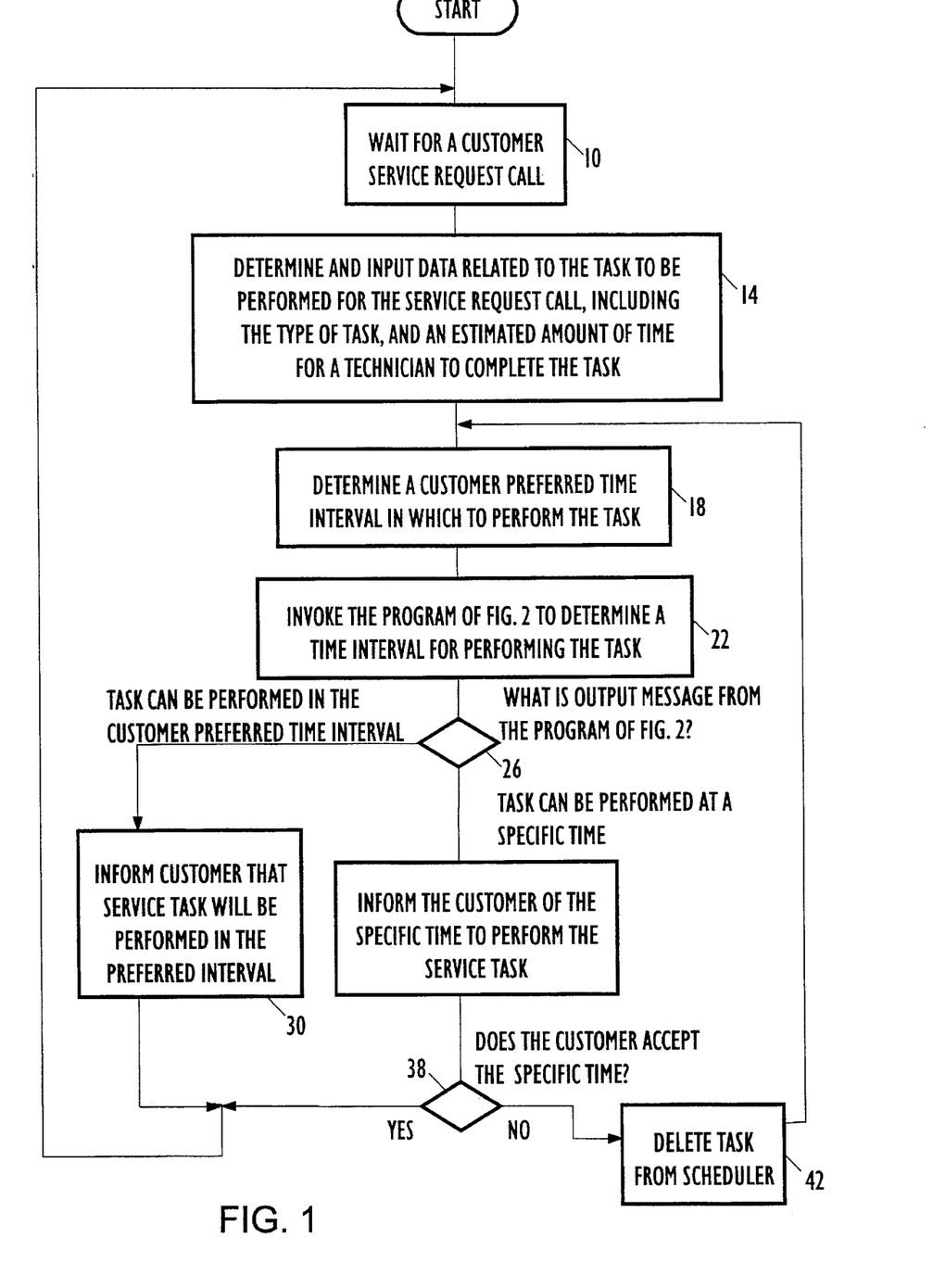
FIG. 1 is a flowchart providing, at a high level, the steps performed when a customer service request is received by a customer service representative.
Figure 2A:
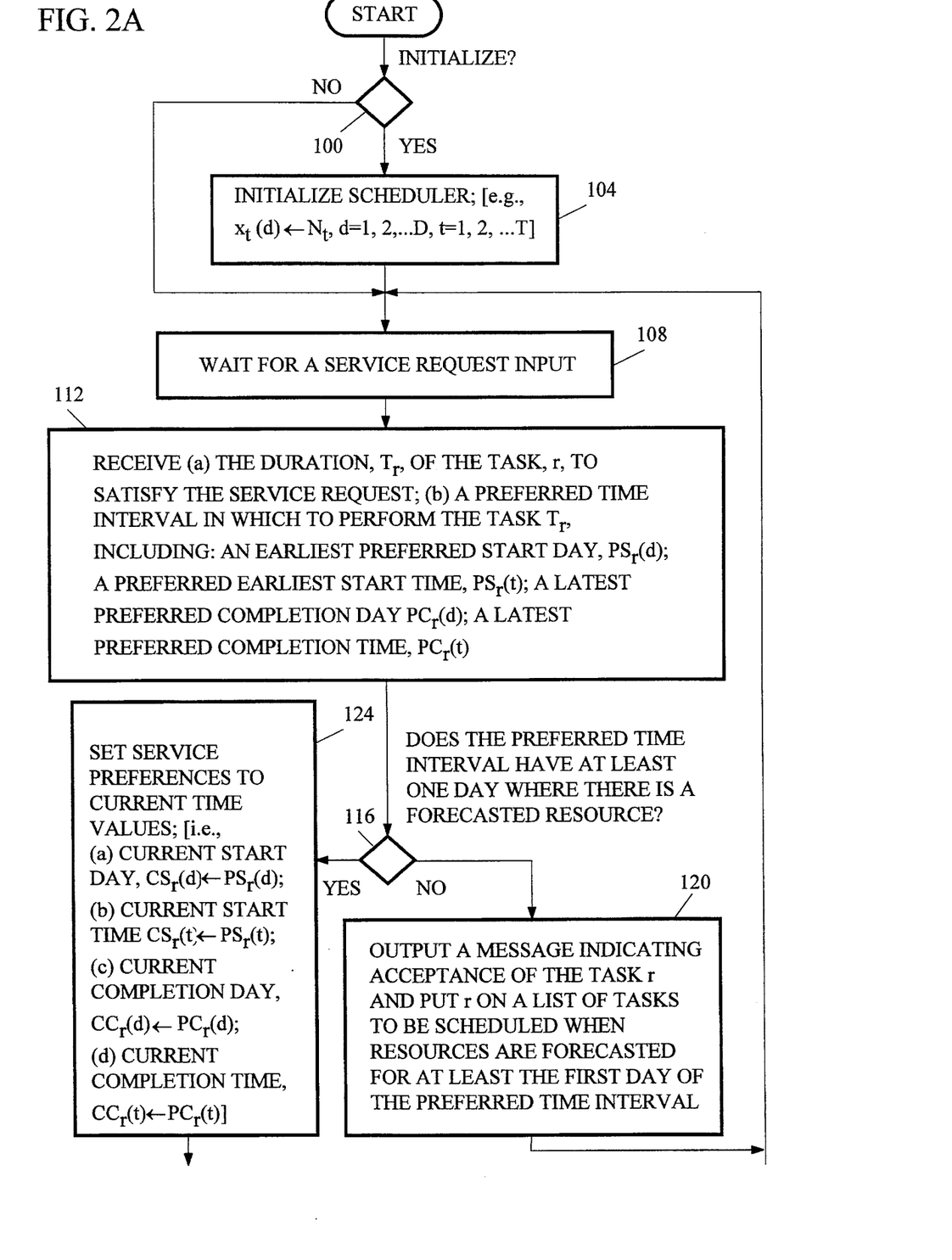
FIG. 2A is a first part of a flowchart of the steps performed by the present invention when determining a time within which a task to fulfill a service request is to be performed.
Figure 2B:
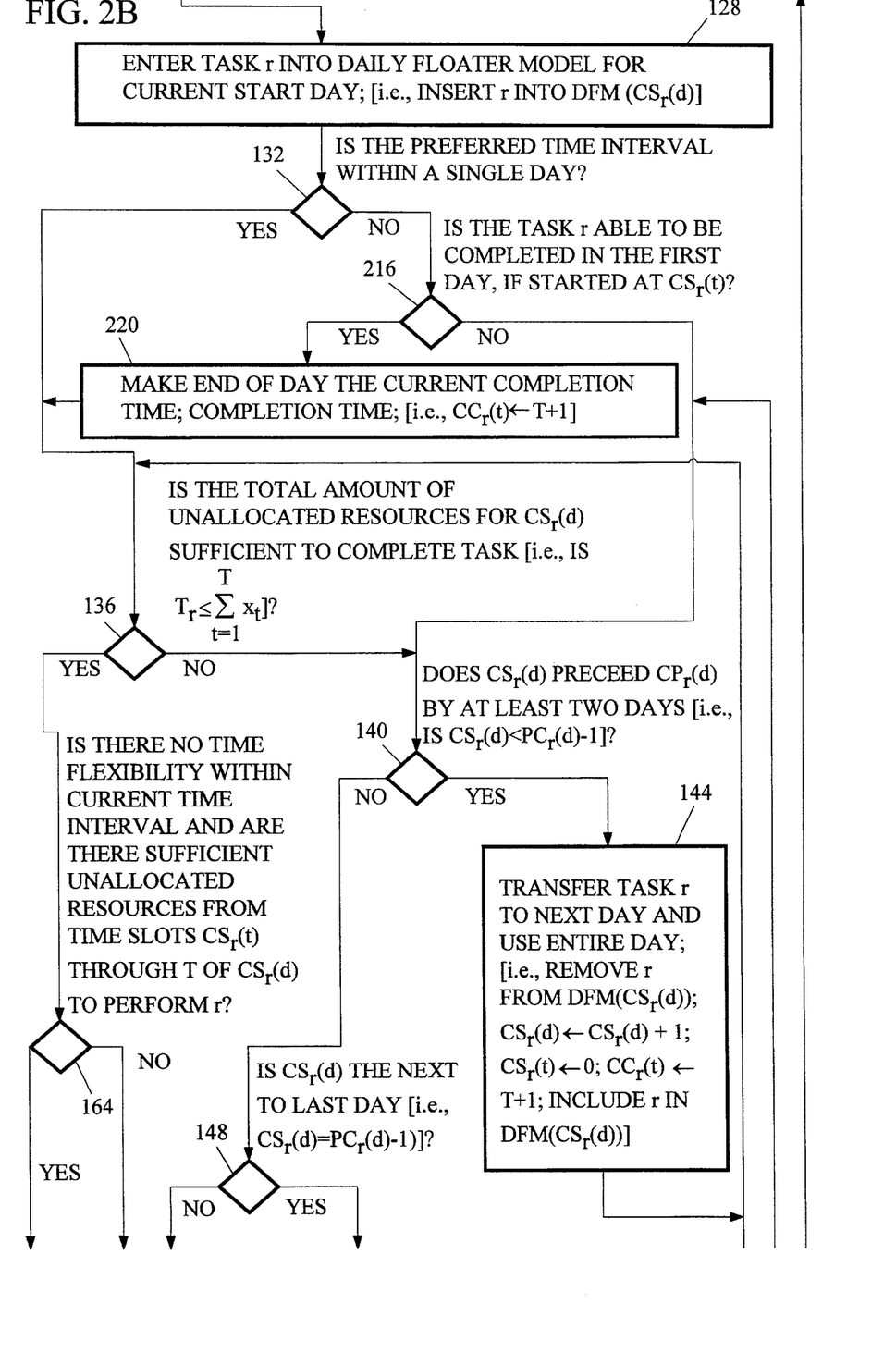
FIG. 2B is a second part of the flowchart having FIG. 2A as a first part.
Figure 2C:
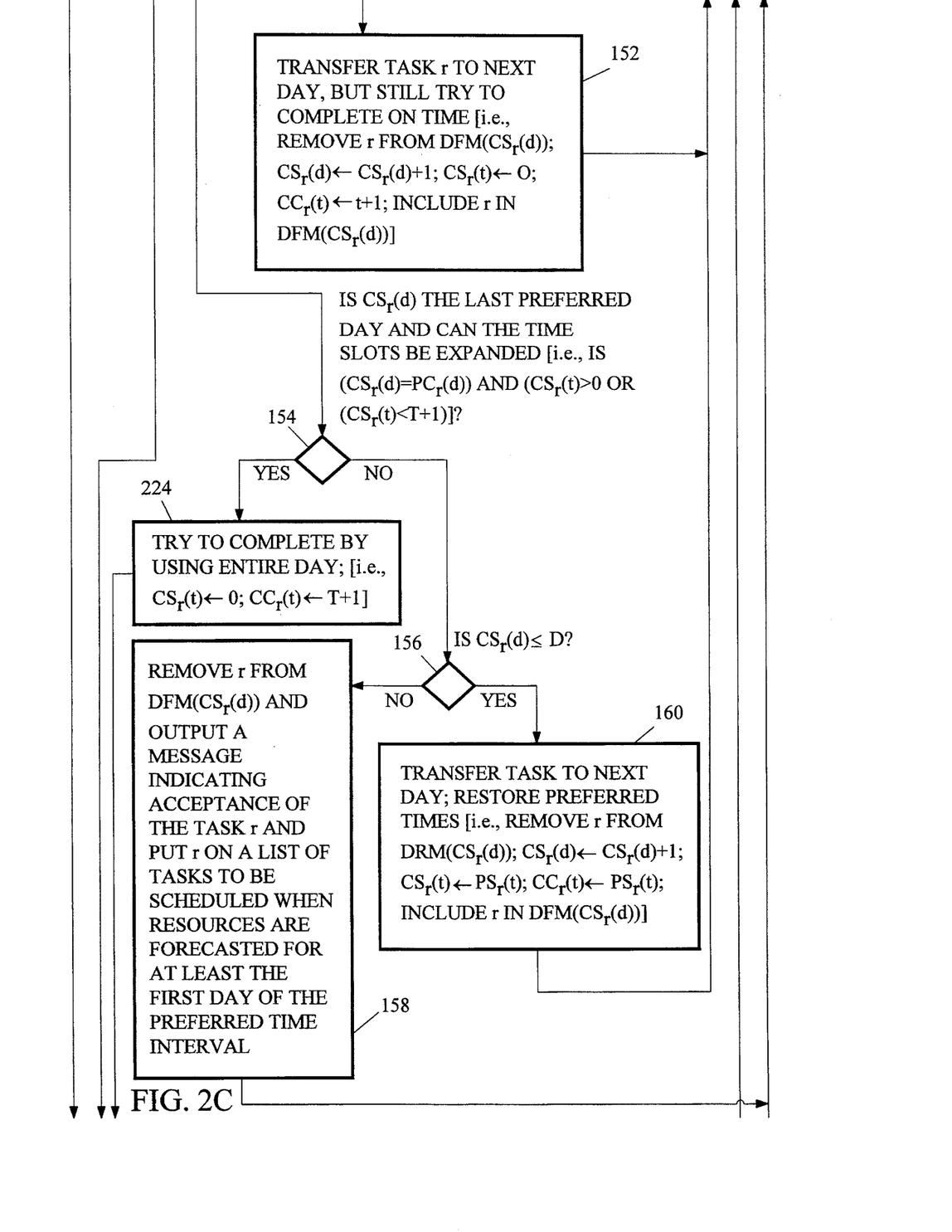
FIG. 2C is a third part of the flowchart having FIG. 2A as a first part.
Figure 2D:
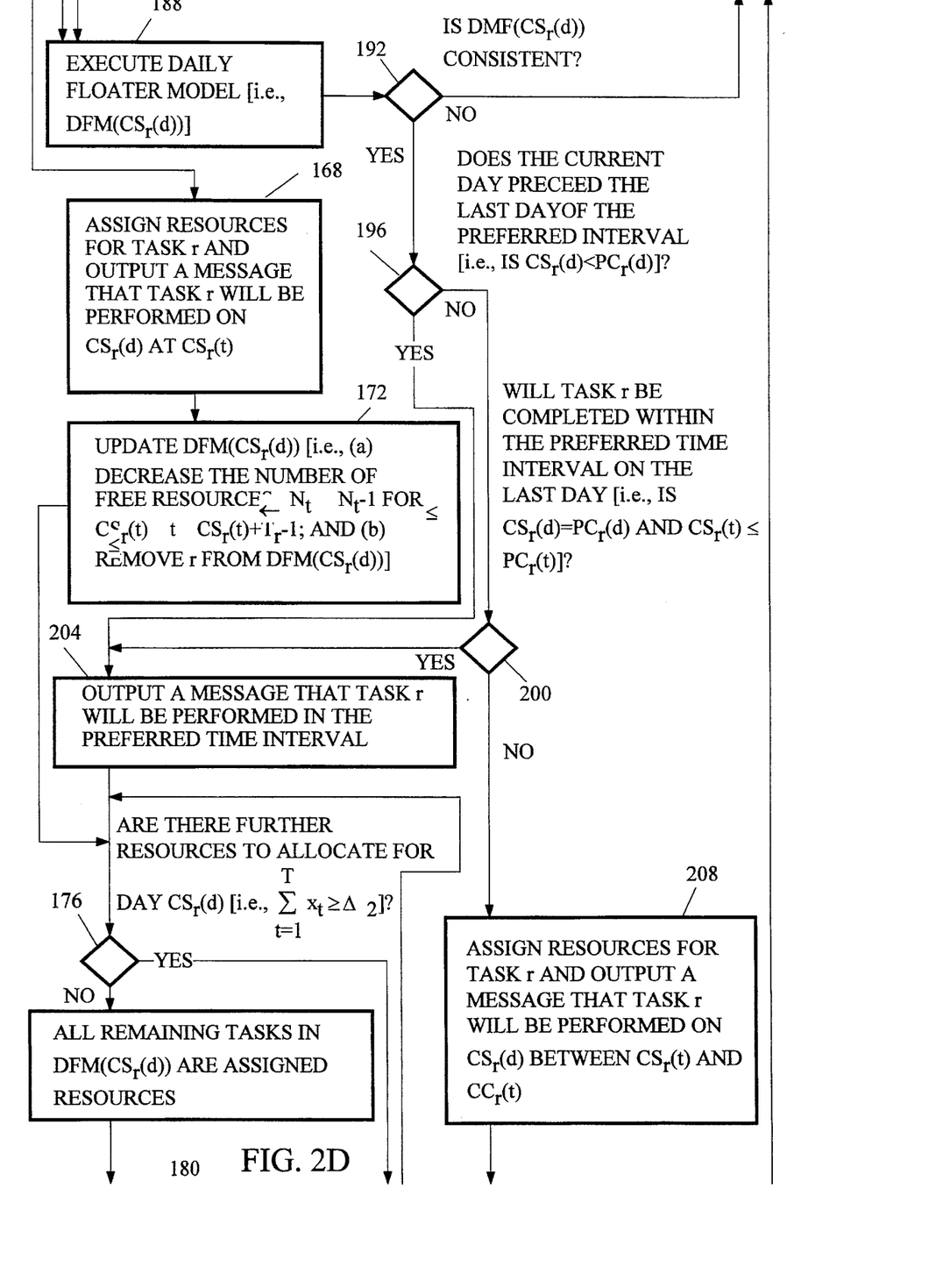
FIG. 2D is a fourth part of the flow chart having FIG. 2A as a first part.
Figure 2E:
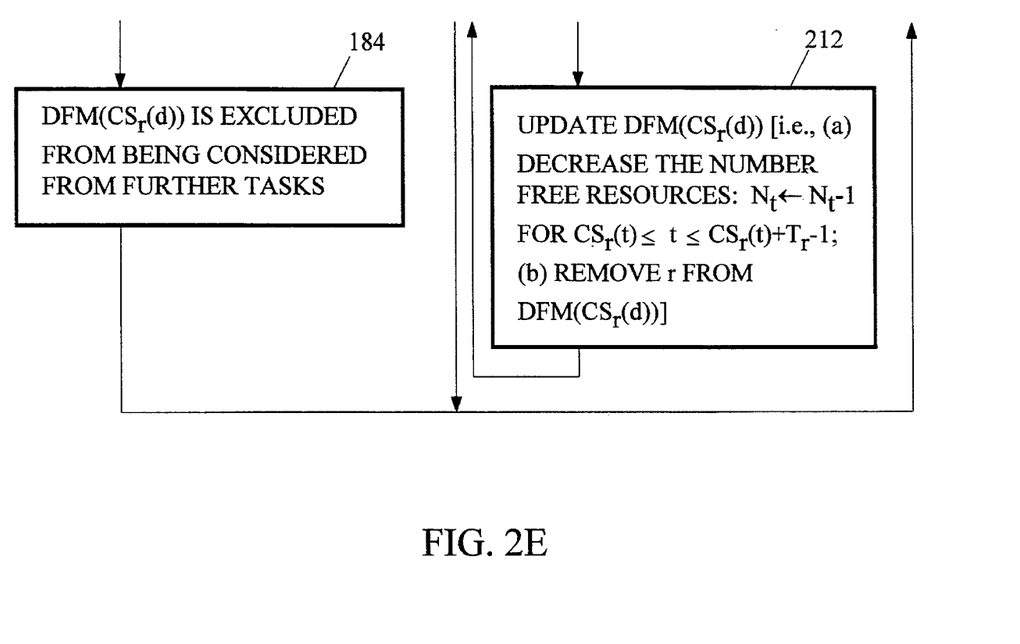
FIG. 2E is a fifth part of the flow chart having FIG. 2A as the first part.

A high level flowchart describing the interaction between the customer and the customer service representative is given in the flowchart of FIG. 1. However, before proceeding with a detailed discussion of the scheduler and the flowchart of FIGS. 2A–2E which embodies the scheduler, a discussion of the following data structures is necessary.

(1.1) r: an integer parameter, r identifies a (service request) task by number, r=1, 2, . . . , R. For simplicity, it is assumed that each task r is performed within a single day. This, however, is not a restriction of the present invention in that, for example, as one skilled in the art will recognize, tasks requiring multiple days may be decomposed and portions scheduled one day at a time.

(1.2) Preferred customer task completion interval parameters:
   (a) $PS_r(d)$: the customer preferred earliest start day for performing the service request task r;
   (b) $PS_r(t)$: the preferred earliest start time within $PS_r(d)$ for performing the service request task r. Note that each day is partitioned into a predetermined number of time slots for designating times within a day such that successive slot times are identified by positive integers. Thus, in one preferred embodiment, each time slot corresponds to half an hour and the time slots for a day are identified with the integers: 0, 1, 2, . . . , 15 wherein 0 is the first time slot of the day and 15 is the last time slot of the day. For simplicity, it is assumed there are T time slots per day. Thus, T+1 denotes the end of the day;
   (c) $PC_r(d)$: the latest preferred completion day for the service request task r;
   (d) $PC_r(t)$: the preferred latest completion time slot within $PC_r(d)$ for the service request task r.

(1.3) Parameters used by the scheduler for specifying the current time interval within which a task may be performed:
   (a) $CS_r(d)$: the current value used by the scheduler as the earliest start day for task r;
   (b) $CS_r(t)$: the current value used by the scheduler as the earliest starting time slot within $CS_r(d)$;
   (c) $CC_r(d)$: the current value used by the scheduler as the completion day for task r;
   (d) $CC_r(t)$: the current value used by the scheduler as the latest completion time slot for the task r within $CS_r(d)$.

(1.4) $T_r$: the estimated time (i.e., time slots) required to perform the task r.

(1.5) $N_t$: the number of resources available for a time slot t within a predetermined day.

(1.6) D: the last day for which resources are forecasted; i.e., the last day for which $N_t$ is defined for each time slot t=1, 2, . . . , T.

(1.7) DFM(d): the data structures and procedures defining the daily floater model (DFM) for day d.

$$x_{rt} = 1, \text{ if the task } r \text{ is scheduled to start at the beginning of time } \begin{cases} \text{slot } t, \\ 0, \text{ otherwise.} \end{cases} \quad (1.8)$$

$r = 1, 2, \ldots, R, t = 0, 1, 2, \ldots, T.$ (1.9) $x_t(d)$ or simply $x_t$ when unambiguous: the number of resources, for a predetermined day d, not allocated to tasks at time slot t, t=1, 2, . . . , T.

(1.10) $\Delta_1$: the value used in determining whether a task has time flexibility or not; i.e., if [the number of time slots between $PC_r(t)$ on $PC_r(d)$ and $PS_r(t)$ on $PS_r(d)] \leq \Delta_1$, then the task r has no time flexibility.

(1.11) $\Delta_2$: a value used in determining whether or not spare resources remain available for a predetermined day; i.e., if $$\sum_{t=1}^{T} x_t < \Delta_2,$$

then (and only then) is it considered that there are no spare resources on the day to which the summation of $x_t$'s relate.

An important component of the present invention is the resource allocation model, DFM, which can now be described in terms of the above defined data structures. The DFM is a mathematical model for scheduling the resources, one scheduling period (e.g. a day) at a time, according to customer service requests received. The model includes an objective function to be minimized (maximized) and, in addition, a number of constraints which must be simultaneously satisfied. At a high level, the DFM preferably minimizes the number of unallocated resources for a day while simultaneously providing a specific starting time for each task r=1, 2, . . . , R, wherein the starting time is not earlier than the customer preferred starting time and such that the task r may be completed within the customer preferred interval. Further, there are DFM constraints requiring that the resources allocated for a given time slot not exceed $N_t$ for each time slot of each day.

The DFM is characterized, for example, for a predetermined day, by the following expressions:

(2.1) the objective (or equivalently optimization) function: minimize $$\sum_{t=1}^{T} x_t$$

subject to the following constraints:

$$\sum_{t=S_r}^{C_r-T_r+1} x_{rt} = 1, r = 1, 2, \ldots, R; \quad (2.2)$$

$$\sum_{r=1}^{R} \sum_{t=t}^{t} x_{rt} + x_t = N_t, t = 1, 2, \ldots, T; \quad (2.3)$$

-continued $$0 \leq x_{rt} \leq 1, \text{integer}, r = 1, 2, \ldots, R, \quad (2,4)$$

$$t = 1, 2, \ldots, T;$$

$$x_t \geq 0 \quad t = 1, 2, \ldots, T, \quad (2.5)$$

$$\text{where} \quad t \equiv t(r, t) = \max\{t - T_r + 1, CS_r(t)\},$$

$$t \equiv t(r, t) = \min\{t, CC_r(t) - T_r + 1\}.$$

From the definitions of $CS_r(t)$, $CC_r(t)$ and $T_r$ it follows (2.6) $x_{rt}=0$ for $t<CS_r(t)$ and for $t>CC_r(t)-T_r+1$.

Referring to the expressions (2.1) through (2.6) above, (2.1) minimizes the total number of spare resources for the day to which the model applies. The constraints provided in (2.2) express the logical requirement that each service request task can be assigned exactly one starting time. The constraints of (2.3) express the requirements that at each time slot t the number of resources having been allocated and/or assigned to tasks to be performed during the time slot cannot exceed the available number of resources. Further note that constraints (2.4) and (2.5) along with the fact that $N_t$ are integers imply that $x_t$ are non-negative integers. Thus, any feasible solution to the DFM above is an integer valued.

As an aside, it is worthwhile to note that a novel aspect of the objective function (2.1) above is that for all feasible solutions to the DFM above, the objective function yields the same value; that is, $$\sum_{t=1}^{T} x_t = \sum_{t=1}^{T} N_t - \sum_{r=1}^{R} T_i.$$

Thus, solving the combinatorial problem presented by the DFM expressions above is equivalent to searching for an arbitrary solution to the system (2.2)–(2.6). Thus, based on this observation, any optimization procedure used in solving the DFM above can be stopped after finding the first integer feasible solution.

Also note that the objective function (2.1) above can be replaced by other objective functions to express alternative requirements when scheduling tasks. For example, consider the following objective function:

$$\text{maximize} \sum_{r=1}^{R} \sum_{t=1}^{T} P_t x_{rt}, \quad (2.7)$$

where time slots t are assigned priorities $P_t$. In this case, the optimal solution to this modified DFM maximizes the sum of priorities of tasks scheduled in specific hours of the day. Further, the modified DFM provided here may be useful for increasing in the generated schedule the number of requests with high priorities assigned to early morning hours. Thus, it is an important aspect of the present invention that various objective functions can be used with the constraints (2.2)–(2.6). Thus, the set of feasible solutions remains unchanged but some feasible solutions are now "better" than others.

Commencing now with the description of the steps of FIGS. 2A–2E, in step 100, a determination is made as to whether the scheduler of the present invention is to be initialized or not. In particular, certain data structures have their values retained between executions of the scheduler once it has been initialized. For instance, all values of $x_t(d)$ may be retained from previous executions of the scheduler. However, if initialization is desired, then in step 104 the number of unassigned resources for each time slot for each day through the forecasted number of days D is initialized with the number of resources that may be provided for tasks. That is, $x_t(d)$ is assigned the value $N_t$, $d=1, 2, \ldots, D$, and $t=1, 2, \ldots, T$. Regardless, however, of the path taken from step 100, step 108 is encountered wherein the scheduler waits for a service request to be input. Once such a request is input, step 112 is performed wherein the following values are determined relating to the task r which is to be performed to satisfy the service request: (a) the duration, $T_r$, of the task r; (b) a preferred time interval in which to perform the task r including an earliest preferred start day $PS_r(d)$; a preferred earliest start time $PS_r(t)$; a latest preferred completion day $PC_r(d)$; and a latest preferred completion time $PC_r(t)$.

Subsequently, in step 116 a determination is made as to whether the preferred time interval has at least one day where there are forecasted resources. If this is not the case, then step 120 is encountered wherein the service request for r is accepted and the task r is put on a list of tasks to be scheduled when resources are forecast for at least the first day of the preferred time interval for r. Subsequently, flow of control is transferred to step 108 to wait for a next service request.

Alternatively, if in step 116 the preferred interval for task r has at least one day with forecasted resources, then step 124 is encountered wherein the current start day $CS_r(d)$, the current start time $CS_r(t)$, the current completion day $CC_r(d)$ and the current completion time $CC_r(t)$ are each assigned the value of the related preferred input parameter associated with the preferred time interval data determined in step 112. Following this step, in step 128, a record corresponding to the task r is entered into the daily floater model for the current start day $CS_r(d)$. Note that for simplicity r will be used to identify both the task and its related record. Further note that since the actual time for performing the task r can in some cases be changed when allocating resources to a subsequent task, the record r includes at least fields having the values $CS_r(d)$, $CS_r(t)$, $CC_r(d)$, $CC_r(t)$, $PS_r(d)$, $PS_r(t)$, $PC_r(d)$ and $PC_r(t)$. Subsequently, in step 132 a determination is made as to whether the preferred time interval is within a single day. Assuming an affirmative answer results in step 132, step 136 is encountered wherein a determination is made as to whether there are sufficient unassigned resources within the current starting day to complete the task r. If this rather primitive test is not satisfied, then there may be one or more iterations of the loop consisting of the eight steps from step 136 through step 160 wherein the task r is moved to a subsequent day, as will be discussed below, in an attempt to satisfy the test of step 136.

Alternatively, if in step 136 there are sufficient resources in $CS_r(d)$, then step 164 is encountered. In this later step, a determination is made as to whether there is no time flexibility within the current time interval and also as to whether there are sufficient unallocated resources within $CS_r(d)$ after $CS_r(t)$ to perform r. In particular, if there is no time flexibility but there are sufficient resources, then step 168 is encountered wherein resources are assigned and a specific time is determined for the task; i.e., resources for task r are assigned and a message is output indicating that the service request has been accepted and that the task r will be performed in the start of the current time interval. Following this step, step 172 is performed wherein the number of unallocated resources is decreased for those time slots of the current service start day $CS_r(d)$ having resources assigned in step 168. Further, the task r is removed from $DFM(CS_r(d))$.

Subsequently, in step 176, a determination is made as to whether there are further resources to allocate for the day $CS_r(d)$. If so, then nothing further remains to be done and control is transferred back to step 108 to wait for another service request. Alternatively, if substantially all resources are allocated for this particular day, then step 180 is encountered wherein any tasks remaining within the DFM(CS$_r$(d)) are assigned resources. That is, those tasks which have had resources allocated to them within their respective current intervals, but have not had resources assigned for specific times are now assigned resources. Subsequently, in step 184 since substantially all resources for CS$_r$(d) have been assigned, DFM(CS$_r$(d)) is excluded from being considered for further tasks. Following this step, step 108 is again encountered and the program for FIG. 1 waits for a new input service request.

Returning now to step 164, if the test at this step is negative then either (a) there is time flexibility within the current time interval for the task r, or (b) there are insufficient unallocated resources within the current time interval for r to perform r. However, note that from step 136 there are sufficient unallocated resources within the current starting day for r. Therefore, control is transferred to step 188 wherein any time flexibility in the current time interval for r and other tasks also in DFM(CS$_r$(d)) are used in an attempt to rearrange the current starting times for r with the other tasks in an attempt to fulfill each task's requirement for allocated resources and thereby provide a consistent model (i.e., tentative schedule) for all the tasks. Note that an important aspect of the present invention involves the high computational efficiency of this step. It is believed that for substantially all real life service request sequences and for reasonable numbers of resources (e.g., $\leq 1000$), step 188 can be solved in approximately 0.01 seconds of computer time on a Sun Sparc Workstation. This can be explained as follows. DFM is an integer programming model. It's constraints possess a special property being facets of integer polyhedron (2.2)–(2.6) as described in the following references:

[1] George L. Nemhauser, Laurence A. Woolsey, "Integer and Combinatorial Optimization", JOHN WILEY & SONS, 1988, 763pp.
[2] Youngho Lee and Hanif D. Sherali, "Unrelated Machine Scheduling with Time-Window and Machine-Downtime Constraints", Annals of Operations Research, vol 50, 339–365,1994.
[3] Hanif D. Sherali and Youngho Lee, "Sequential and simultaneous lifting of minimal cover inequalities for GOB constrained knapsack polytopes", to appear in SIAM Journal on Discrete Mathematics, 1995.

This means that solving the system (2.2)–(2.6) with integrality requirements (2.4) excluded, which is easy because it is equivalent to solving a linear programming problem, in many cases leads to integer solution thus providing extremely fast solution to the considered combinatorial problem.

Following this step, in step 192, a determination is made as to whether the daily floater model from step 188 was able to allocate appropriate resources to all tasks currently requesting allocations on the day, CS$_r$(d). If no such consistent model for DFM(CS$_r$(d)) is obtained, then some portion of the seven steps 140–160 are performed wherein some portion of the current time interval for the task r is at least determined for modification in preparation for allocating resources for r on a day when a consistent daily floater model may be obtained. Alternatively, if in step 192 a consistent model is obtained, then in step 196 a determination is made as to whether the current day, CS$_r$(d), precedes the last day of the preferred interval. If the results of this determination is negative, then in step 200 a determination is made as to whether the task r is presently scheduled to be completed within the preferred time interval on the last day. If so, then the step 204 is performed wherein a message is output indicating that task r will be performed in the preferred time interval. Note that the step 204 is also performed when leaving step 196 via the positive branch.

Alternatively, if step 200 results in a determination that task r will not be completed within the preferred time interval on the last day, then step 208 is performed wherein resources are assigned for the task r and a message is output indicating that r will be performed on CS$_r$(d) between CS$_r$(t) and CC$_r$(t) (note, that CS$_r$(t)<=CC$_r$(t) if this step is performed). Subsequently, in step 212, DFM(CS$_r$(d)) is updated. That is, the number of free resources for this day is decreased for the time slots for which the task r is to be performed. Further, r is now removed from DFM(CS$_r$(d)) since an exact time for performing r has been output thereby forbidding further changes to the resources assigned to r. Following this step, step 176 is again encountered. In fact, step 176 is encountered regardless of the path taken from step 196. Thus, as discussed above, a determination is made in step 176 as to whether there are further resources which may be allocated for the day CS$_r$(d) and, if not, then in steps 180 and 184 the remaining tasks in DFM(CS$_r$(d)) are assigned and this model is excluded from being considered for further tasks. Thus, as the flow of control from step 176 demonstrates, step 108 is subsequently performed wherein the program of FIGS. 2A–2E waits for another service request input.

Returning now to step 132, if the preferred time interval is not within a single day, as has been assumed in the discussion above, then the negative branch from this step is taken wherein step 216 is encountered. In this step a determination is made as to whether task r is able to be completed in the first day of the multi-day preferred interval if r is started at CS$_r$(t). That is, a determination is made as to whether there are sufficient time slots T$_r$ remaining in the first day beyond CS$_r$(t) to complete the task r. If so, then step 220 is performed wherein the current completion time is assigned to the end of the day. Subsequently, step 136 is again encountered to determine whether there are sufficient unallocated resources to complete task r within this day. Since the flow of control leaving step 136 along both the positive and negative paths has been discussed above, one skilled in the art will understand the applicability to the present context of the various flow of control paths of steps 136–212 that have been discussed above. Alternatively, if task r cannot be completed in the first day, then the negative branch from step 216 is followed to step 140. In step 140, a determination is made as to whether the current starting day precedes the preferred completion day by at least two days. If so, then the next day is not the last day of a multi-day preferred time interval. Therefore, in proceeding to the next step (step 144), there need be no concern regarding completing task r within the preferred time interval if r can be completed on the next day. Therefore, bearing these facts in mind, in step 144 the task r is transferred to the next day and the current starting and completion times are set such that all time slots for this next day may be considered when attempting to allocate resources for r. Subsequently, step 136 is again encountered wherein a determination is made as to whether there are sufficient unallocated resources in the current starting time day for r to complete. If an affirmative answer is provided from step 136 then step 164 and subsequent steps as discussed above are performed. Alternatively, if in step 136 a negative result is obtained then step 140 is again encountered wherein the current time interval for r is modified in subsequent steps in an attempt to allocate resources to r. Thus, for example, if the negative branch from step 140 is taken, step 148 is encountered wherein a determination is made as to whether the current starting day for the task r is the next to the last day of the current interval. If an affirmative answer is provided in step 148, step 152 is performed wherein the task r is again transferred to the next day. However, instead of attempting to schedule r within any of the time slots of the day as in step 144, in step 152 only the portion of the day up to the preferred completion time is specified for use. That is, $CC_r(t)$ receives the value of $PC_r(t)$. Subsequently, step 136 is again encountered. Alternatively, if from step 148 a negative result is obtained, then step 154 is performed wherein a determination is made as to whether the current starting day is the last preferred day. Note that whenever the flow of control reaches step 154, the current starting day is either the last day of the preferred time interval or beyond the last day, and in either case the program has been unsuccessful in appropriately allocating resources to the task r. Thus, r cannot be performed within the preferred time interval. However, it may still be possible to perform the task r within the last day of the preferred time interval if the preferred times within this last day can be expanded. Thus, if the current starting day is beyond the last day or the time intervals within the last day cannot be expanded, then step 156 is encountered wherein a determination is made as to whether resources have been scheduled for the next day. If not, then in step 158 r is removed from $DFM(CS_r(d))$, a message is output indicating acceptance of r, and r is put on a list of tasks to be scheduled when resources are forecasted for $CS_r(d_j)$. Subsequently, step 108 is again encountered. Alternatively, if $CS_r(d)$ has resources forecasted, then step 160 is encountered wherein the task r is transferred to the next day and the current starting and completion times within the day are reset to the preferred starting and completion times, respectively. Thus, an attempt is made to at least perform r within what is believed to be the preferred time interval within a day for completing the task r. Note that an assumption is made here that $PS_r(t) \leq PS_r(t)$. It is believed that this is typically true for most service requests. However, in the event this does not hold, then $CS_r(t)$ is assigned the value 0 and $CC_r(t)$ is assigned the value T+1. Subsequently, step 136 is again encountered and processing proceeds as described above regarding step 136 and those steps along the flow of control paths from step 136.

Returning now to step 154, if the current day is the last day and the current time interval within the last day can be expanded, then step 224 is performed wherein the time slots for allocating resources to r are expanded to include all time slots within the current day. Following this, step 188 is encountered wherein the daily floater model is again executed to determine if a consistent allocation of resources to all tasks within the model for the current day can be obtained. Subsequently, in step 192 a determination is made as to whether the model for the current day is consistent. If not, step 140 and those steps reachable from step 140 are again performed in search of another time interval within which to allocate resources for r. Otherwise, if in step 192 the model is determined to be consistent, then step 196 and those steps reachable from step 196 are performed wherein resources are at least allocated for task r.

Figure 3:
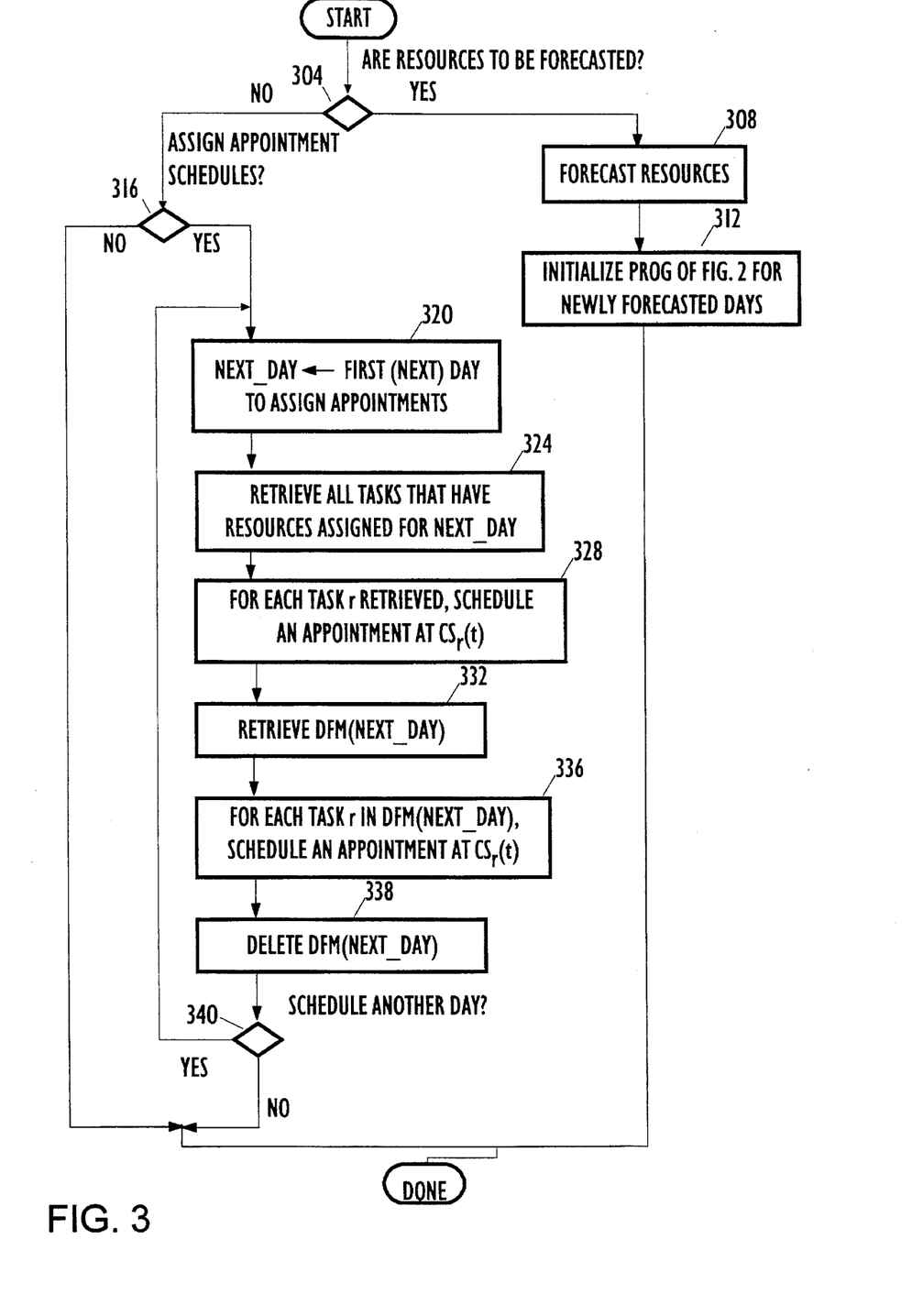
FIG. 3 is a flowchart of the steps performed when an appointment is provided for each task in each of one or more scheduling periods (e.g., days).

In FIG. 3 a flowchart is presented describing the steps taken when using the scheduler of FIGS. 2A through 2E to manage resources. In step 304 a determination is made as to whether further resources are to be forecasted. If so, then in step 308 resources for some number of days are forecasted. Subsequently, in step 312 the program of FIGS. 2A–2E is initialized for these additional days with the forecasted resources $N_t$ for each new day and time slot within the day.

Alternatively, if in step 304 resources are not to be forecast, then in step 316 a determination is made as to whether one or more appointment schedules are to be produced for scheduling specific resources at specific times for each task within one of the days. If such appointment schedules are to be provided, then step 320 is performed wherein the variable "NEXT_DAY" is assigned the first day for which an appointment schedule is to be provided. Subsequently, in step 324, all tasks for "NEXT_DAY" that have had resources assigned to them in the scheduler are retrieved. In step 328, each task r retrieved in step 324 has its assigned resources scheduled. That is, a specific resource (e.g., a technician) is specified to perform the task r in an appointment commencing at $CS_r(t)$. Following this, in step 332 DFM(NEXT_DAY) is retrieved so that the remaining tasks within this daily floater model which have been allocated resources (but not assigned resources) may also be scheduled. In step 336, the tasks within the DFM(NEXT_DAY) are scheduled in a similar manner to those tasks in step 328. Subsequently, in step 338, the daily floater model for NEXT_DAY is deleted. Following this, a determination is made in step 340 as to whether another day is to be scheduled. If so, then steps 320 through 340 are performed again. Otherwise, the flowchart terminates. As an aside, it is worthwhile to note that each task r in one of the daily floater models retrieved in step 332 is a candidate for having its current time interval modified at any time until its daily floater model is retrieved in step 332. Thus, tasks having time flexibility may potentially be provided with the final appointment time immediately before a schedule for the day of the appointment is created.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for scheduling a predetermined plurality of resources, comprising the steps of:

receiving a plurality of requests for services requiring at least some of said predetermined plurality of resources, said plurality of requests including a first request and a second request;

establishing a schedule for said plurality of requests, comprising the step of performing steps (A1)–(A4) for at least one of the first and second request;

(A1) obtaining information related to the request, said information including (a) a preferred time interval for performing a task related to the request for providing a requested service and (b) an estimate related to an amount of said predetermined plurality of resources for performing the task related to the request, wherein said preferred time interval is longer than a time estimated to perform said task associated with the revest;

(A2) determining an actual time interval within which to allocate said estimated amount of resources for performing the task, said actual time interval being determined using said preferred time interval as input for solving a combinatorial optimization model, wherein said actual time interval is longer than said time estimated to perform said task associated with the request;

(A3) outputting a message indicating the actual time interval determined in step (A2), wherein said message is output substantially immediately after receiving the request; and (A4) retaining said actual time interval for the request as part of said schedule, said actual time interval providing scheduling flexibility in that said task associated with the request may be commenced at more than one time within said actual time interval and yet still be completed within said actual time interval.

2. A method as claimed in claim 1, wherein said predetermined plurality of resources includes an amount of time for each of a plurality of service providers.

3. A method as claimed in claim 2, wherein said estimate related to an amount of said predetermined resources to perform a task includes an amount of time for a service provider of said plurality of service providers to perform the task.

4. A method as claimed in claim 1, wherein said step of obtaining includes soliciting said preferred time interval from a customer supplying the request.

5. A method as claimed in claim 1, wherein for each said request of said plurality of requests, each said actual time interval includes an integral number of time slots in a discrete series of predetermined time slots.

6. A method as claimed in claim 1, further including a step of providing a first starting time for commencing a first task related to the first request and a second starting time for commencing a second task related to the second request wherein said first and second tasks are to be performed within their respective actual time intervals; and wherein, when said time intervals for the first and second tasks overlap, said first and second tasks are to be performed without an overlap when the actual time interval overlap requires more of said predetermined plurality of resources than are available.

7. A method as claimed in claim 6, wherein said step of providing includes using a predetermined function to be optimized and a predetermined set of constraints to be satisfied when said function is optimized.

8. A method as claimed in claim 7, wherein said predetermined function relates to a work load measurement for a plurality of service providers.

9. A method as claimed in claim 7, wherein said set of constraints provides for a single starting time for a task related to a request.

10. A method as claimed in claim 8, wherein said set of constraints includes, for a predetermined time slot, a constraint relating a number of said service providers available for task assignment in said predetermined time slot to a sum of: (a) a number of allocated service providers for said predetermined time slot and (b) a number of unallocated service providers for said predetermined time slot.

11. A method as claimed in claim 7, wherein said step of providing includes solving a combinatorial optimization model for a feasible allocation of said predetermined plurality of resources, said predetermined function and said predetermined set of constraints included in said combinatorial optimization model.

12. A method as claimed in claim 6, wherein said step of providing includes shifting a current or proposed starting time for said first task when:

(a) said actual time interval for the first request is longer than a time to perform said first task;

(b) there is a time slot where said first and second tasks overlap if said first task commences at said current starting time for said first task and said second task commences at said second starting time; and (c) there are insufficient resources in said time slot to allocate resources to both said first and second tasks.

13. A method as claimed in claim 6, wherein said step of providing includes shifting a current or proposed starting time for said second task when:

(a) said actual time interval for the second request is longer than a time to perform said second task;

(b) there is a time slot where said first and second tasks overlap if said first task commences at said first starting time for said first task and said second task commences at said current starting time for said second task; and (c) there are insufficient resources for said time slot to allocate resources to both said first and second tasks.

14. A method as claimed in claim 6, wherein each of said first and second tasks are performed in a same predetermined scheduling period.

15. A method as claimed in claim 1, wherein said actual time interval is one or more days in length.

16. A method as claimed in claim 1, wherein said step of determining includes solving a combinatorial optimization model for determining said time actual interval.

17. A method as claimed in claim 1, wherein said step of determining includes determining a current starting time for the task such that the task is performed in said preferred time interval for the request when commenced at said current starting time.

18. An apparatus for scheduling a plurality of tasks, comprising:

input means for inputting, for each service request of a series of service requests, request data related to the service request, said request data including a preferred time for commencing a task related to the service request, said task requiring a predetermined amount of resources from a predetermined plurality of resources;

means for determining, for each service request of the series of service requests, a service time to perform the related task, said means for determining including a means for solving a combinatorial optimization model for said service time when said input means supplies said request data related to the service request, wherein said service time determined for each of the service requests is determined before said request data related to a next service request of the series of service requests is supplied, wherein said means for solving includes means for determining an extreme value for a predetermined objective function of said combinatorial optimization model, wherein said extreme value satisfies a predetermined plurality of constraints of said combinatorial optimization model;

output means for outputting, for each service request of the series of service requests, information indicating said service time for the service request;

wherein, for each of the service requests, said service time for the service request is substantially identical to said preferred time for commencing the task related to the service request when said predetermined amount of resources required by the task is determined to be available for a consistent solution of said combinatorial optimization model.

19. An apparatus as claimed in claim 18, wherein each said service request is a request for a telecommunication service.

20. An apparatus as claimed in claim 18, wherein said request data for substantially all of the service requests includes an estimated amount of resources of said predetermined plurality of resources to perform the task related to the service request.

21. An apparatus as claimed in claim 18, wherein said input means includes a data entry device used by a customer service representative to input said request data for a service request from the series of service requests.

22. An apparatus as claimed in claim 18, wherein said predetermined plurality of resources includes resources forecasted for each of a predetermined number of time slots for a scheduling period.

23. An apparatus as claimed in claim 22, wherein said plurality of constraints includes constraints providing: (a) for each of the service requests whose service time has been determined, there is exactly one starting time for the task related to the service request, and (b) for each time slot having forecasted resources, a maximal number of said resources allocated to tasks related to the service requests in the time slot does not exceed the forecasted resources for the time slot.

24. An apparatus as claimed in claim 22, wherein said predetermined objective function is a function of a number of unallocated resources for the predetermined number of time slots in the scheduling period.

25. An apparatus as claimed in claim 18, wherein said predetermined objective function is a function of a weighted sum of a plurality of parameter values, each parameter value related to a time for performing a task for a service request of said series of service requests.

26. An apparatus as claimed in claim 18, wherein said means for determining includes storage means for storing first data related to said predetermined amount of said resources for performing the task related to a first service request of the series of service requests wherein said service time has been determined for said first service request, wherein said first data is used by said means for determining in determining a service time for a second service request later in said series of said service requests than said first service request.

27. An apparatus as claimed in claim 18, wherein said means for determining includes storage means for storing current data related to said service time for a first service request of the series of service requests wherein said service time for said first service request has been determined, said current data used by said means for determining in determining a service time for a second service request later in said series of service requests than said first service request.

28. An apparatus as claimed in claim 27, wherein said means for determining includes means for changing said current data when: (a) said preferred time for said first service request includes a first time interval larger than an amount of time to perform the task related to said first service request, and (b) said preferred time for said second service request includes a second time interval overlapping said first time interval.

29. An apparatus as claimed in claim 27, wherein said means for determining includes means for reallocating resources of said predetermined plurality of resources so that resources allocated to the task related to said first service request are reallocated to the task related to said second service request when: (a) said preferred time for said first service request is longer than an estimated amount of time to perform the related task, and (b) said preferred times for said first and second service requests overlap in a time slot having insufficient unallocated resources to perform the tasks for said first and second service requests concurrently.

30. A method for scheduling customer service requests for a predetermined time period, comprising the steps of:

receiving a service request from a customer;

identifying a first time interval within said predetermined time period for performing said service request, wherein said first time interval is longer than an estimated service time to perform said service request;

generating a schedule for said predetermined time period utilizing said first time interval, said schedule comprising a second time interval for performing said service request, wherein said second time interval is longer than said estimated service time required to perform said service request;

storing said second time interval;

communicating said second time interval to said customer, wherein said storing step maintains said second time interval in a fixed condition for said service request such that said service request will be performed during said second time interval and further to alleviate a need to recontact said customer based upon one or more subsequent receiving steps;

determining a current starting time within said second time interval to commence performing said service request and which will allow for completion of said service request within said second time interval; and repeating said identifying, generating, storing, communicating and determining steps for one or more subsequent executions of said receiving step associated with said predetermined time period;

wherein for each execution of said repeating step, said generating step regenerates said schedule for said predetermined time period by modifying said current starting time for at least one previously received service request, wherein said current starting time will still be within said second time interval for the previously received service request and will still allow for completion of said service request within the associated second time interval.

31. A method, as claimed in claim 30, wherein said first time interval and an associated said second time interval are the same.

32. A method, as claimed in claim 30, wherein said first time interval and an associated said second time interval are overlapping.

33. A method, as claimed in claim 30, wherein said first time interval and an associated said second time interval are different.

34. A method, as claimed in claim 30, wherein a service time required to perform said service request is less than said first time interval.

35. A method, as claimed in claim 30, wherein a service time required to perform said service request is equal to said first time interval, and wherein an associated said second time interval from said generating step is the same as said first time interval.

36. A method for scheduling a predetermined plurality of resources, comprising:

receiving a plurality of requests for services requiring some of said predetermined plurality of resources, said plurality of requests including a first request and a second request;

performing steps (A1)–(A3) for each of the first and second request, said performing for the first request completed before commencing said performing for the second request;

(A1) obtaining information related to the request, said information including (a) a preferred time interval for performing a task related to the request for providing a requested service and (b) an estimate related to an amount of said predetermined plurality of resources for performing the task related to the request;

(A2) determining a time interval within which to allocate said estimated amount of resources for performing the task, said time interval being determined using said preferred time interval as input for solving a combinatorial optimization model;

(A3) outputting a message indicating the time interval determined in step (A2), said message is output substantially immediately after receiving the request;

providing a first starting time for commencing a first task related to the first request and a second starting time for commencing a second task related to the second request wherein said first and second tasks are to be performed within their respective time intervals; and wherein, when said time intervals for the first and second tasks overlap, said first and second tasks are to be performed without an overlap when the time interval overlap requires more of said predetermined plurality of resources than are available.

37. A method as claimed in claim 36, wherein said step of providing includes using a predetermined function to be optimized and a predetermined set of constraints to be satisfied when said function is optimized.

38. A method as claimed in claim 37, wherein said predetermined function relates to a work load measurement for a plurality of service providers.

39. A method as claimed in claim 37, wherein said set of constraints provides for a single starting time for a task related to a request.

40. A method as claimed in claim 38, wherein said set of constraints includes, for a predetermined time slot, a constraint relating a number of said service providers available for task assignment in said predetermined time slot to a sum of: (a) a number of allocated service providers for said predetermined time slot and (b) a number of unallocated service providers for said predetermined time slot.

41. A method as claimed in claim 37, wherein said step of providing includes solving a combinatorial optimization model for a feasible allocation of said predetermined plurality of resources, said predetermined function and said predetermined set of constraints included in said combinatorial optimization model.

42. A method as claimed in claim 36, wherein said step of providing includes shifting a current or proposed starting time for said first task when:

(a) said time interval for the first request is longer than a time to perform said first task;

(b) there is a time slot where said first and second tasks overlap if said first task commences at said current starting time for said first task and said second task commences at said second starting time; and (c) there are insufficient resources in said time slot to allocate resources to both said first and second tasks.

43. A method as claimed in claim 36, wherein said step of providing includes shifting a current or proposed starting time for said second task when:

(a) said time interval for the second request is longer than a time to perform said second task;

(b) there is a time slot where said first and second tasks overlap if said first task commences at said first starting time for said first task and said second task commences at said current starting time for said second task; and (c) there are insufficient resources for said time slot to allocate resources to both said first and second tasks.

44. A method as claimed in claim 36, wherein each of said first and second tasks are performed in a same predetermined scheduling period.

45. An apparatus for scheduling a plurality of tasks, comprising:

input means for inputting, for each service request of a series of service requests, request data related to the service request, said request data including a preferred time for commencing a task related to the service request, said task requiring a predetermined amount of resources from a predetermined plurality of resources;

means for determining, for each service request of the series of service requests, a service time to perform the related task, said means for determining including a means for solving a combinatorial optimization model for said service time when said input means supplies said request data related to the service request, wherein said service time determined for each of the service requests is determined before said request data related to a next service request of the series of service requests is supplied, wherein said means for determining includes storage means for storing first data related to said predetermined amount of said resources for performing the task related to a first service request of the series of service requests wherein said service time has been determined for said first service request, wherein said first data is used by said means for determining in determining a service time for a second service request later in said series of said service requests than said first service request;

output means for outputting, for each service request of the series of service requests, information indicating said service time for the service request;

wherein, for each of the service requests, said service time for the service request is substantially identical to said preferred time for commencing the task related to the service request when said predetermined amount of resources required by the task is determined to be available for a consistent solution of said combinatorial optimization model.

46. An apparatus for scheduling a plurality of tasks, comprising:

input means for inputting, for each service request of a series of service requests, request data related to the service request, said request data including a preferred time for commencing a task related to the service request, said task requiring a predetermined amount of resources from a predetermined plurality of resources;

means for determining, for each service request of the series of service requests, a service time to perform the related task, said means for determining including a means for solving a combinatorial optimization model for said service time when said input means supplies said request data related to the service request, wherein said service time determined for each of the service requests is determined before said request data related to a next service request of the series of service requests is supplied, wherein said means for determining includes storage means for storing current data related to said service time for a first service request of the series of service requests wherein said service time for said first service request has been determined, said current data used by said means for determining in determining a service time for a second service request later in said series of service requests than said first service request;

output means for outputting, for each service request of the series of service requests, information indicating said service time for the service request;

wherein, for each of the service requests, said service time for the service request is substantially identical to said preferred time for commencing the task related to the service request when said predetermined amount of resources required by the task is determined to be available for a consistent solution of said combinatorial optimization model.

47. An apparatus as claimed in claim 46, wherein said means for determining includes means for changing said current data when: (a) said preferred time for said first service request includes a first time interval larger than an amount of time to perform the task related to said first service request, and (b) said preferred time for said second service request includes a second time interval overlapping said first time interval.

48. An apparatus as claimed in claim 46, wherein said means for determining includes means for reallocating resources of said predetermined plurality of resources so that resources allocated to the task related to said first service request are reallocated to the task related to said second service request when: (a) said preferred time for said first service request is longer than an estimated amount of time to perform the related task, and (b) said preferred times for said first and second service requests overlap in a time slot having insufficient unallocated resources to perform the tasks for said first and second service requests concurrently.

* * * * *